United States Patent Office 3,163,430
Patented Dec. 29, 1964

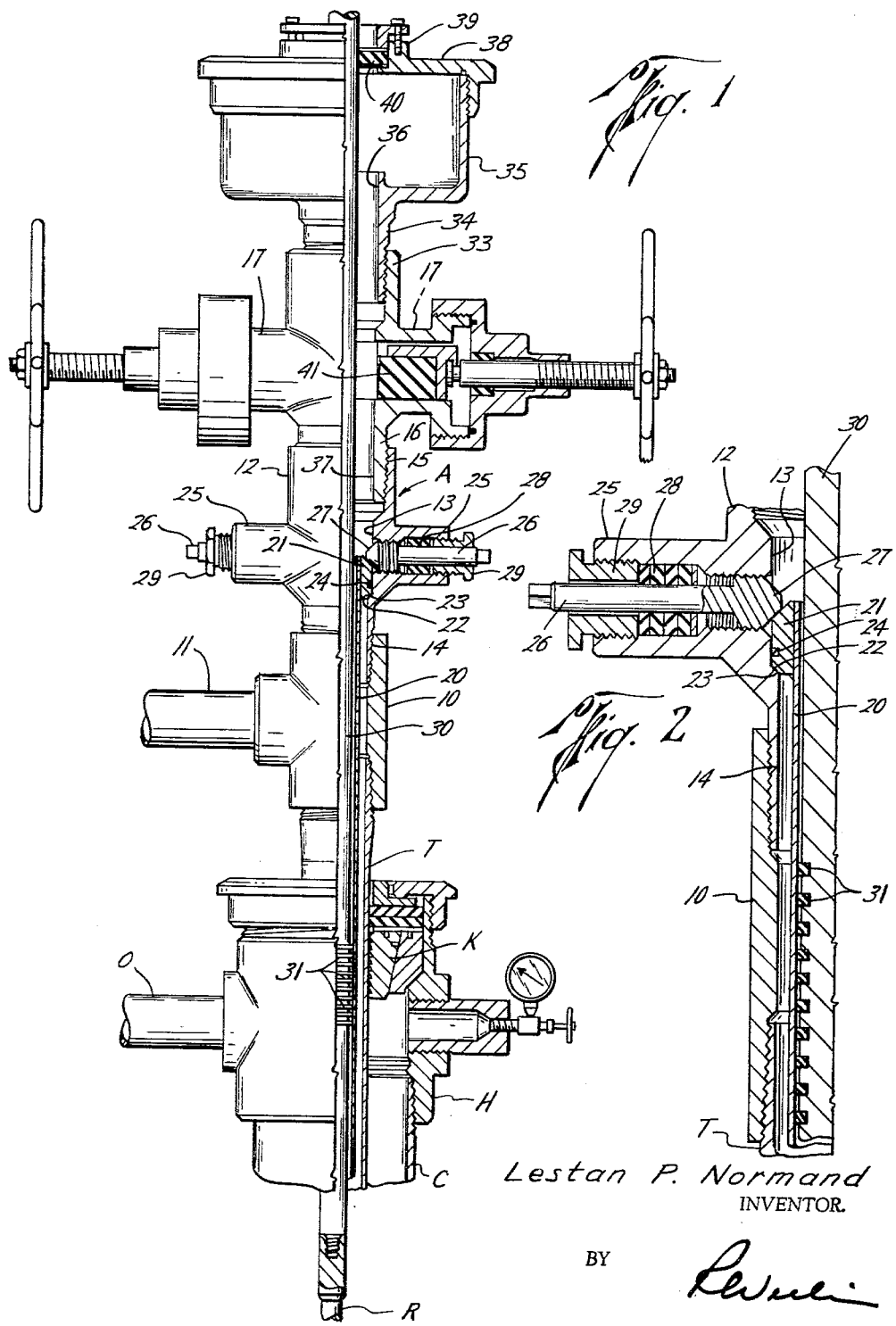

3,163,430
STUFFING BOX ASSEMBLY FOR SUCKER ROD STRINGS
Lestan P. Normand, Beaumont, Tex., assignor to Gulf Coast Machine & Supply Company, Beaumont, Tex., a corporation of Texas
Filed Aug. 1, 1962, Ser. No. 214,023
4 Claims. (Cl. 277—19)

This invention relates to a stuffing box assembly for the sucker rod strings of oil well pumps.

In oil wells employing conventional bottom hole pumps actuated by a reciprocating string of sucker rods extending to the surface and connected to a conventional pumping jack or other power mechanism, a stuffing box is conventionally used to pack-off about the rod string in the wellhead against leakage of well fluid. Such conventional stuffing box assemblies employ a relatively expensive smooth surfaced rod section, commonly termed the "polish rod," which extends through the stuffing box and connects the rod string to the power unit. Compressible packings of various types are disposed in the stuffing box about the polish rod and are compressed about the polish rod by means of the usual bolted glands in order to provide a fluid-tight slidable seal about the polish rod.

Such conventional stuffing box assemblies are subject to numerous difficulties in use. Since the effectiveness of the seal depends upon compression of the packing about the polish rod, a high degree of friction is generated by reciprocation of the rod with resultant rapid wear of both the expensive polish rod and the packing. Frequent servicing is required to tighten and replace the packing, often after only short periods of use, and to replace the expensive polish rod. Such servicing and maintenance also result in undesirable loss of operating time for the well.

Accordingly, it is a primary object of the present invention to provide a stuffing box assembly which will obviate the many disadvantages, such as enumerated above, to which conventional stuffing box assemblies are subject.

Among the principal objects of this invention are the provision of a stuffing box assembly which eliminates the necessity for an expensive polish rod; which develops less friction and drag than conventional stuffing boxes; which is clean operating through elimination of external stuffing box leaks; which is self-lubricating; requires little servicing or maintenance; and which may be installed in any conventional wellhead structure.

In accordance with this invention, the stuffing box assembly includes an elongate sleeve or cylinder which is supported by means of a simple hanger in the bore of the production tubing string and encloses a rod section carrying a plurality of packing rings mounted on its exterior to slidably seal with the bore wall of the cylinder.

It is, therefore, a more specific object of this invention to provide a stuffing box assembly employing a rod section carrying external packing which is reciprocable in a cylinder supported in the bore of the well production pipe.

A further object is to provide a stuffing box assembly of the character described employing a lubricant reservoir in communication with the cylinder for continuously bathing the packing elements with lubricant.

Other and more specific objects and advantages of this invention will become more readily apparent from the following detailed description when read in conjunction with the accompanying drawing which illustrates one useful embodiment in accordance with this invention.

In the drawing:

FIG. 1 is a longitudinal quarter-sectional view of a wellhead structure for a pumping well employing a stuffing box assembly in accordance with this invention; and FIG. 2 is a fragmentary longitudinal sectional view, on an enlarged scale, of the principal elements of the stuffing box assembly.

As illustrated in FIG. 1, the wellhead equipment includes a well casing C on which is mounted a conventional casinghead H through which extends a production pipe string, such as a tubing string T. The latter is supported on casinghead H, in the usual manner, by means of a conventional tubing hanger K. Casinghead H is provided with the usual outlet pipe O communicating with the annulus between casing C and tubing T. The upper end of tubing T is threadedly received in one end of a pumping T 10 having the side outlet 11 through which fluid flowing upwardly through tubing T will be discharged to the exterior of the well.

The stuffing box assembly, designated generally by the letter A, is mounted on the upper end of pumping T 10 and comprises a generally tubular housing 12 having an axial bore 13 and formed at its lower end into an externally threaded pin 14 which is threadedly received in the upper end of pumping T 10. At its upper end housing 12 has an internally threaded box 15 adapted to receive the threaded end 16 of a blowout preventer 17 of conventional design, or other conventional wellhead fittings and equipment. An elongate cylinder 20 is coaxially disposed in bore 13 and extends through the bore of pin 14 and of the pumping T into the bore of tubing T. At its upper end cylinder 20 is secured to a hanger collar 21 which forms an external shoulder 22 engageable with an upwardly facing internal shoulder 23 formed in bore 13 of housing 12. An annular packing 24 is mounted in the periphery of hanger collar 21 to form a fluid-tight seal with the wall of bore 13 of the housing. Housing 12 is provided with a pair of oppositely outwardly extending tubular bosses 25—25 through the bore of which extend hold-down screws 26—26 which are threadedly received in the bores of the bosses for radially retractable movement. The inner ends 27 of screws 26 are adapted to project into bore 13 of the housing and extend over the upper end of hanger collar 21 to releasably hold the hanger collar down on shoulder 23. Packing 28 is mounted about the shank of each of the hold-down screws 26 and is compressed to seal about the hold-down screws by means of the glands 29. A cylindrical piston rod 30 extends through the bore of the stuffing box assembly including the bore of cylinder member 20, and is adapted to be connected at its lower end to the upper end of a string of pumping or sucker rods R and at its upper end to the pumping jack or power mechanism (not shown), which is commonly used for reciprocating well pump sucker rod strings. Piston rod 30 has mounted on a portion thereof, inside cylinder member 20, a plurality of longitudinally spaced packing rings 31 of any suitable and generally conventional form adapted to form a slidable seal with the bore wall of cylinder member 20. The packing rings 31 are arranged over a sufficient length of the piston rod to assure against leakage between the rod and the cylinder member, and the packing section is located on the piston rod in such position that it will remain inside the bore of cylinder member 20 throughout the pumping stroke. It will be understood that the length of cylinder member 20 will be made to accommodate whatever length of pumping stroke may be required in any particular installation.

The upper end of blowout preventer 17 is provided with an internally threaded box 33 which is adapted to threadedly receive the externally threaded end of a tubular nipple 34 which is secured to the bottom of an annular casing 35, the interior of which communicates bore 36 of nipple 34 with bore 37 of the blowout preventer and thence with bore 13 of the stuffing box housing. Casing 35 is adapted to define a reservoir for a liquid lubricant which may flow from the interior of casing 35 through bores 36 and 37 into bore 13 of housing 12. From the latter lubricating fluid may flow through the annular space between cylinder member 20 and rod 30 in order to provide lubricant for packing rings 31. By keeping the reservoir in casing 35 filled with a suitable lubricant, the packing carried by the rod may be protected against running dry. The upper end of casing 35 is closed by means of a removable cap 38 the center of which has an annular stuffing box 39 surrounding piston rod 10 and containing wiper packing 40 to seal about the rod to prevent loss of lubricant from casing 35 as a result of reciprocation of rod 10. Blowout preventer 17 is fitted with the usual rams 41 operable to close off the bore of the wellhead structure about rod 10 in the event excessive pressures develop in the tubing string. It will be understood that in most instances pressures in pumping wells are comparatively small. In such cases, blowout preventer 17 may be eliminated entirely and nipple 34 of the lubricant casing may be screwed directly into box 15 of housing 12. In any case, blowout preventer 17 forms no part of this invention and is illustrated merely for purposes of showing one of various types of wellhead assemblies for pumping wells.

In operation, reciprocation of the rod string will, of course, reciprocate the piston rod and packing rings 31 inside the bore of cylinder member 20, packing rings 31 providing an effective fluid-tight seal between the piston rod and the cylinder member, which does not require any compression, but provides its sealing function by reason of the amount of sealing surface provided by the rings. In this connection, the number of rings may be made as great or as small as desired in order to provide adequate sealing surface. Generally, a number of closely spaced rings extending over a piston rod length of from about four to about 12 inches will be sufficient to provide adequate sealing in most instances. A useful arrangement is to employ ¼ inch rings spaced ¼ inch apart. The fluid raised by the string of rods will flow through the annular space between cylinder member 20 and tubing T and will be discharged through outlet pipe 11 from the pumping T. Seal 24, between hanger collar 25 and the wall of bore 31, will prevent the well fluid from passing above the cylinder member.

Cylinder member 20 is preferably constructed of ordinary brass tubing and requires no special finishing or polishing in order to provide an effective seal for packing rings 31. Other metallic tubing may be employed, but since standard brass tubing may be employed, it is obvious a relatively inexpensive construction is provided.

The stuffing box assembly, as described, will be operated with a minimum of drag or friction, while at the same time, maintaining a highly efficient seal. As a result, the rod runs cool at all times, even in the absence of lubricant, but the latter will be found desirable particularly in cases where the well itself should pump dry.

From the foregoing, it will be seen that this invention provides an improved stuffing box assembly for sucker rod strings which fulfills the various objects as set forth hereinabove, and particularly a relatively low cost construction, which is largely free of difficulties in operation and requires little maintenance.

It will be understood that various changes and modifications may be made in the details of the illustrative embodiment within the scope of the appended claims, but without departing from the spirit of this invention.

What I claim and desire to secure by Letters Patent is:

1. A stuffing box assembly for a pump rod string reciprocable in a well pipe, comprising, a tubular housing adapted to be coaxially mountable in said well pipe to form a part thereof, an annular seat in the bore of the housing, an elongate cylinder member disposed in the bore of the housing to extend coaxially into the bore of the well pipe between the rod string and said well pipe, said cylinder member extending downwardly below said seat and having its lower end free with respect to said rod string and said well pipe, an annular shoulder member about the upper end of said cylinder member disposable on said seat, an annular packing arranged to seal between said shoulder member and the bore wall of said housing, hold-down screws retractably mounted in the wall of said housing and cooperating with said shoulder member to releasably hold said shoulder member on said seat, a piston rod reciprocably disposed in the bore of said cylinder and connectible into the pump rod string, and seal means mounted in the exterior of said piston rod to slidably seal with the bore wall of said cylinder.

2. A stuffing box assembly according to claim 1, wherein said cylinder member is constructed of brass tubing.

3. A stuffing box assembly according to claim 1, wherein said seal means comprises a plurality of longitudinally spaced packing rings disposed along said piston rod.

4. A stuffing box assembly according to claim 1 including a hollow annular casing mounted on said housing surrounding said piston rod, and conduit means providing fluid communication between the interiors of said casing and said housing.

References Cited in the file of this patent

UNITED STATES PATENTS

| | | |
|---|---|---|
| 1,060,961 | Waitz | May 6, 1913 |
| 1,071,360 | Shiery | Aug. 26, 1913 |
| 1,394,114 | Purtle | Oct. 18, 1921 |
| 2,148,327 | Smith | Feb. 21, 1939 |
| 2,286,300 | Outcalt | June 16, 1942 |
| 2,480,055 | Seaton | Aug. 23, 1949 |
| 2,544,212 | Bayless | Mar. 6, 1951 |
| 2,578,669 | Butterfield | Dec. 18, 1951 |